United States Patent
Ye et al.

(10) Patent No.: US 10,256,717 B2
(45) Date of Patent: Apr. 9, 2019

(54) ZERO CURRENT DETECTION CIRCUIT FOR CONVERTER SOFT SWITCHING CONTROL

(71) Applicant: Texas Instruments Incorporated, Dallas, TX (US)

(72) Inventors: Zhong Ye, Plano, TX (US); Sanatan Rajagopalan, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 140 days.

(21) Appl. No.: 15/230,061

(22) Filed: Aug. 5, 2016

(65) Prior Publication Data

US 2017/0040899 A1 Feb. 9, 2017

Related U.S. Application Data

(60) Provisional application No. 62/201,915, filed on Aug. 6, 2015.

(51) Int. Cl.
| | |
|---|---|
| *H02M 1/42* | (2007.01) |
| *H02M 7/219* | (2006.01) |
| *H02M 3/158* | (2006.01) |
| *H02M 1/00* | (2006.01) |
| *H02M 1/12* | (2006.01) |

(52) U.S. Cl.
CPC ....... *H02M 1/4225* (2013.01); *H02M 1/4233* (2013.01); *H02M 3/1584* (2013.01); *H02M 7/219* (2013.01); *H02M 1/126* (2013.01); *H02M 2001/0009* (2013.01); *H02M 2001/0058* (2013.01); *H02M 2003/1586* (2013.01); *H02M 2007/2195* (2013.01); *Y02B 70/126* (2013.01); *Y02B 70/1491* (2013.01)

(58) Field of Classification Search
CPC ....... H02M 2001/0058; H02M 1/4233; H02M 1/4225; H02M 2007/2195; H02M 7/219
See application file for complete search history.

(56) References Cited

U.S. PATENT DOCUMENTS

2009/0267658 A1* 10/2009 Bridge ............... H02M 3/1584
 327/141
2013/0249504 A1* 9/2013 Hsu ..................... H02M 1/4225
 323/207

\* cited by examiner

*Primary Examiner* — Timothy J Dole
*Assistant Examiner* — Ishrat Jamali
(74) *Attorney, Agent, or Firm* — Tuenlap Chan; Charles A. Brill; Frank D. Cimino (57) ABSTRACT

A circuit includes a zero current detector (ZCD) circuit that senses an inductor current of an inductor and generates signal pulses indicating when an increasing cycle of the inductor current crosses a predetermined current value and when a decreasing cycle of the inductor current crosses the predetermined current value. A sync control provides a control signal specifying one of the signal pulses corresponding to the increasing or decreasing cycle of the inductor current. A sync selector circuit generates a sync pulse representing the signal pulse from the ZCD in response to the control signal. The sync pulse triggers a timing adjustment for a switch device.

18 Claims, 5 Drawing Sheets

ZERO CURRENT DETECTION CIRCUIT FOR CONVERTER SOFT SWITCHING CONTROL

CROSS-REFERENCE TO RELATED APPLICATION

This application claims the benefit of U.S. Provisional Patent Application 62/201,915, filed on Aug. 6, 2015, and entitled ZERO CURRENT DETECTION AND INTERLEAVED ZVS BUCK/BOOST CONVERTER CONTROL METHOD, the entirety of which is incorporated by reference herein.

TECHNICAL FIELD

This disclosure relates to a zero current detection circuit and more particularly to soft switching control.

BACKGROUND

Zero-voltage-switching (ZVS) transition-mode (TM) circuits have gained significant application appeal due to soft switching operation, low electromagnetic interference (EMI), and high power conversion efficiency. Totem-pole power factor correction (PFC) and ZVS bi-directional direct current/direct current (DC/DC) circuits are two application examples that can employ ZVS techniques. For example, totem-pole PFC circuits operating at transition mode and ZVS can achieve about 99% or greater efficiency with traditional MOSFET switches. A DC/DC 48V-to-12V ZVS TM Buck, Boost, and bidirectional Buck-Boost converters can also achieve about 97% or more efficiency with the same control schemes as the PFC circuit. However, the complexity and high cost of implementing the control, especially for interleaved configurations (e.g., where multiple inductor phases are controlled), tend to limit the topologies to few high-end applications.

SUMMARY

This disclosure relates to a zero current detection and control circuit for converter soft switching control.

In one example, a circuit includes a zero current detector (ZCD) circuit that senses an inductor current of an inductor and generates signal pulses indicating when an increasing cycle of the inductor current crosses a predetermined current value and when a decreasing cycle of the inductor current crosses the predetermined current value. A sync control provides a control signal specifying one of the signal pulses corresponding to the increasing or decreasing cycle of the inductor current. A sync selector circuit generates a sync pulse representing the signal pulse from the ZCD in response to the control signal. The sync pulse triggers a timing adjustment for a switch device.

In another example, a circuit includes a zero current detection circuit that senses an inductor current of an inductor and generates a sync pulse indicating when a discharge cycle of the inductor current crosses a predetermined current value. A control circuit that utilizes the sync pulse to control timing of at least one pair of switch devices. The sync pulse begins a delay period in the control circuit to increase the end of a discharge period of the inductor current for one of the pair of switch devices.

In yet another example, a circuit includes a zero current detection circuit that senses an inductor current of an inductor associated with a master phase and generates a sync pulse indicating when a discharge cycle of the inductor current crosses a predetermined current value during the master phase. A control circuit utilizes the sync pulse to control timing of at least two pairs of switch devices to provide an output voltage. One pair of switch devices operate the inductor in the master phase to drive the output voltage and another pair of switch devices operate another inductor in a subordinate phase to the master phase to drive the output voltage. The sync pulse begins a delay period in the control circuit to increase the end of a discharge period of the inductor current in the master phase. The controller adjusts timing of the subordinate phase based on timing adjustments to the master phase.

DETAILED DESCRIPTION

This disclosure relates to a zero current detection circuit for converter soft switching control. The zero current detection circuit monitors inductor current as it is being driven via a pair of switch devices. One of the switch devices (e.g., active switch) is turned on to store energy in the inductor. After the energy storage period, another switch device (e.g., freewheel switch) is turned on to discharge the stored energy from the inductor into an output capacitor that provides a load voltage. Each of the switch devices can be configured in a totem-pole (e.g., half-bridge) configuration where a common node of the totem-pole is connected to the inductor for alternating storing and discharging energy. After the discharge period, a negative current is generated where negative current refers to a current opposite in direction of the storing current to the active switch. It is desirable that the negative current fully discharge the active switch's parasitic capacitance to about zero volts before beginning the next inductor storage period. This is referred to as zero volt switching (ZVS) operation and facilitates energy efficiency in the circuit. In conventional schemes, a series resistor coupled to the load was monitored by a control circuit to determine when a zero current condition had occurred. From that determination, the control circuit had to re-compute timing for the present inductor phase and all subsequent phases. Such monitoring and timing computations could overwhelm control bandwidth in some applications.

The zero current detection circuit of this disclosure obviates the need for analog current sensing. The detection circuit includes a zero current detection (ZCD) circuit that determines when the inductor current reaches a predetermined threshold current, such as zero amperes, for example. The ZCD circuit drives a sync selector circuit, which provides a sync pulse to the control circuit (e.g., as PWM period counter reset or an interrupt) indicating when the zero current condition has been achieved. Based on the sync pulse, the control circuit can extend the timing of the discharge (also referred to as freewheeling) period of the inductor to facilitate that the zero volt condition of the common node has been achieved before starting a subsequent charging cycle. By implementing the ZCD circuit and sync selector, the control circuit no longer has to employ its computing resources to detect zero current conditions as in many existing designs. The circuit-based approach disclosed herein also increases the efficiency of the circuit since the series sensing resistor can be removed. Moreover, timing adjustments to control the end of the discharge cycle of the inductor can be added as a predetermined value in response to the sync pulse, which further mitigates control circuit timing computations.

The zero current detection circuit can be utilized in power factor correction (PFC) circuits, boost mode DC/DC converter circuits, buck mode DC/DC converters, and buck/boost converters, for example. The zero current detection circuit can also be extended to multiphase power circuits to control multiple inductors. For example, the zero current detection circuit can be connected to the inductor of a master phase to provide master sync pulses that the control circuit uses to adjust timing for the inductor of such master phase. The control circuit further can utilize the master sync pulses to adjust timing of subordinate phases.

Figure 1:
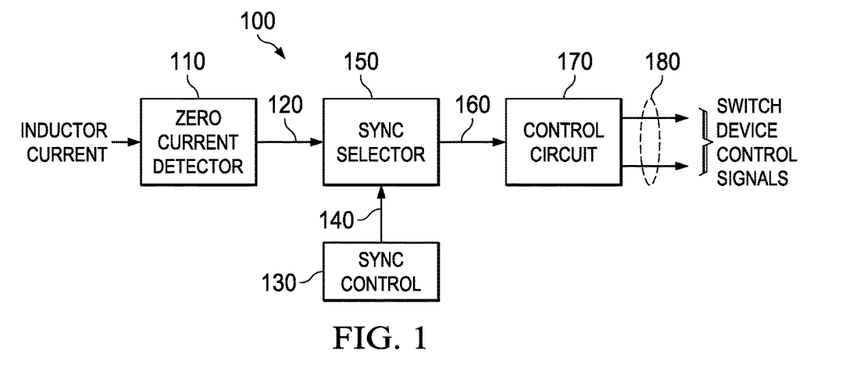
FIG. 1 illustrates an example schematic block diagram of a zero current detection and control circuit.

FIG. 1 illustrates an example of a zero current detection circuit 100. As used herein, the term circuit can include a collection of active and/or passive elements that perform a circuit function such as an analog circuit or control circuit, for example. Additionally or alternatively, the term circuit can include an integrated circuit where all and/or some of the circuit elements are fabricated on a common substrate, for example.

As shown in the example of FIG. 1, a zero current detector (ZCD) circuit 110 senses an inductor current of an inductor (not shown) and generates one or more signal pulses 120 indicating when an increasing cycle of the inductor current crosses a predetermined current value (e.g., zero current threshold) and when a decreasing cycle of the inductor current crosses the predetermined current value. In examples disclosed herein, the predetermined current is zero; although, in other examples, different current values could be set for triggering signal pulses. A sync control 130 provides a control signal 140 specifying whether the signal pulses correspond to an increasing or decreasing cycle of the inductor current. The control signal 140 can be a logic value of zero or one, for example. The sync control 130 enables the circuit 100 to discriminate between active and freewheeling states of the switch devices (e.g., in a totem pole configuration) used to supply the inductor current.

A sync selector circuit 150 generates a sync pulse 160 corresponding to the signal pulse 120 from the ZCD 110 that is selected from one of the increasing or decreasing cycles of the inductor current in response to the control signal 140. The sync selector circuit 150 provides the sync pulse 160 to a control circuit 170 to trigger timing adjustments for a switch device (or devices). The control circuit 170 thus employs the sync pulse to perform timing adjustments on switch device control signals 180. The control signals 180 can drive switch devices arranged in a totem-pole configuration (e.g., totem-pole switch device pairs) that are coupled to supply electrical current to the inductor. Thus, by activating the totem-pole switch device pairs to alternate the direction of current through the inductor, electrical energy is efficiently stored and transferred to/from the inductor. Examples of totem-pole configurations are illustrated with respect to FIGS. 5 and 10.

In one example, the ZCD circuit 110 can include a current sense transformer that generates the signal pulse 120 from the sensed inductor current. The current sense transformer can be a ferrite bead, for example, that is selected to shape the pulse width of the signal pulse 120 based on a saturation parameter of the ferrite bead. A lower saturation point for the ferrite bead corresponds to narrower pulse 120, for example. At least one zener diode (not shown, but see, e.g., FIG. 5) can be provided at the output of the ZCD circuit 110 to control/clamp the magnitude of the signal pulse 120. A rectifier circuit in the sync selector circuit 150 can control a polarity of the sync pulse 120 with respect to the increasing or decreasing cycle of the inductor current. For example, positive pulses 120 can be passed by the rectifier circuit and negative pulses can be inverted to positive.

The sync selector circuit 150 can also include a controllable switch device (e.g., analog switch, relay) to provide the sync pulse 160 based on the control signal 140 when the inductor current crosses the predetermined threshold during each cycle of the inductor current. As will be described below, the inductor current can cross the current threshold more than one time during a given cycle of inductor current, and the sync selector 150 captures one of the threshold-crossing occurrences each cycle depending on the control signal 140. The control signal 140 thus can specify an operating mode of the circuit, which may be fixed or vary over time. In one example, the control signal 140 may indicate polarity of the inductor current (e.g., positive AC current or negative AC current for a PFC converter). In another example, the control signal 140 may indicate a mode of converter operation (e.g., buck, boost, and so forth).

Figure 10:
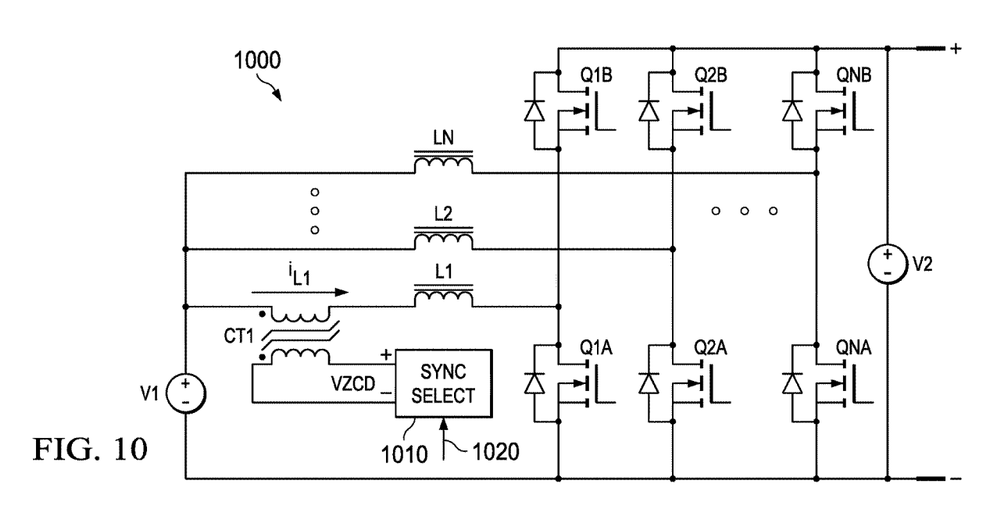
FIG. 10 illustrates an example multiphase circuit for a direct current (DC) to DC converter that utilizes a zero current detection circuit.

As a further example, the control circuit 170 can operate as the sync control 130, and generate the control signal 140 based on a buck or boost setting determined by the control circuit (See, e.g., FIG. 10). In another example, the sync control 130 can include a polarity monitor circuit that monitors an alternating current (AC) waveform that drives the inductor. The polarity monitor circuit generates the sync control signal 130 indicating a positive or negative cycle of the AC waveform. The control circuit 170 can utilize the sync pulse 160 to control the switch devices via the signals 180 in various converter applications. These applications can include a power factor correction (PFC) circuit for AC applications, a boost mode DC/DC converter circuit, a buck mode DC/DC converter, and a buck/boost mode DC/DC converter, for example.

The control circuit 170 utilizes the sync pulse to control timing of at least one pair of switch devices, which, as noted previously, can be configured in a totem-pole configuration. The sync pulse 160 triggers a beginning of a delay period in the control circuit 170 to increase the end of a discharge period of the inductor current for one of the pair of switch devices. Based on the sync pulse 160, the control circuit 170 can extend the timing of the discharge period of the inductor to facilitate that the zero voltage condition of the totem-pole common node between switch devices has been achieved before starting a subsequent charging cycle. The ZCD 110 and sync selector 150 cooperate to provide the sync pulse 160 to the control circuit 170 such that the control circuit no longer has to monitor for the zero current condition as in some existing ZVS circuits.

Figure 2:
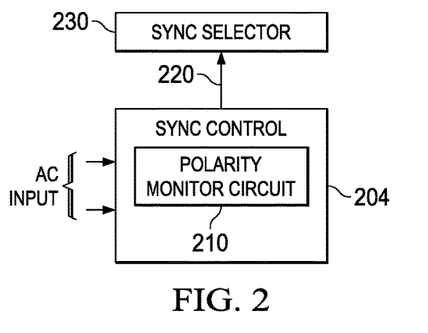
FIG. 2 illustrates an example sync control to provide a control signal to a sync selector.

FIG. 2 illustrates an example of a sync control 204 that that includes a polarity monitor circuit 210 to provide a control signal 220 to a sync selector 230. In this example, the polarity monitor circuit 210 can be employed in a power factor correction (PFC) circuit (See, e.g., FIG. 5), which controls the power factor of an incoming AC waveform via the switch devices described herein. As shown, input AC waveform (e.g., line-neutral or line-line signal) can be monitored by the polarity monitor circuit 210. In one example, the polarity monitor circuit 210 can be a comparator the monitors the AC voltage and provides a logic one value indicating that the AC input is positive or a logic zero value indicating that the AC input is negative. Depending on the control signal 220, the sync selector 230 generates a similar polarity sync pulse (e.g., positive polarity) regardless of whether or not its input (e.g., signal pulse 120) is positive or negative. Also, the sync selector 230 passes the first zero crossing event encountered while rejecting a subsequent crossing event in the same discharge cycle. Such pulse generation is illustrated and described below with respect to the signal diagram depicted in FIG. 7.

Figure 3:
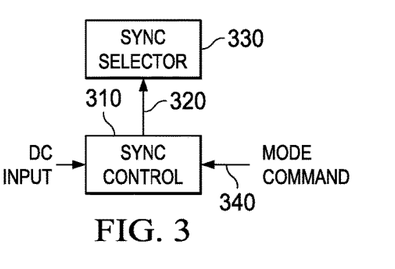
FIG. 3 illustrates another example of a sync control to provide a control signal to a sync selector.

FIG. 3 illustrates an example of a sync control 310 receives a DC input to provide a control signal 320 to a sync selector circuit 330. In this example, a mode command 340 can be monitored by the sync control 310. The sync control 310 in this example can be a standalone circuit or a control circuit that receives the mode command 340, for example. The mode command 340 can specify buck mode or boost mode for DC/DC converter applications. For example, in an automotive application, boost mode may be required on initial startup whereas as the battery achieves its full power level, a control circuit operating as the sync control 310 may automatically switch into buck mode. The mode command 340 can be specified via a user application (e.g., register or memory setting specifying buck or boost mode operation) or can be determined automatically by the control circuit.

Figure 4:
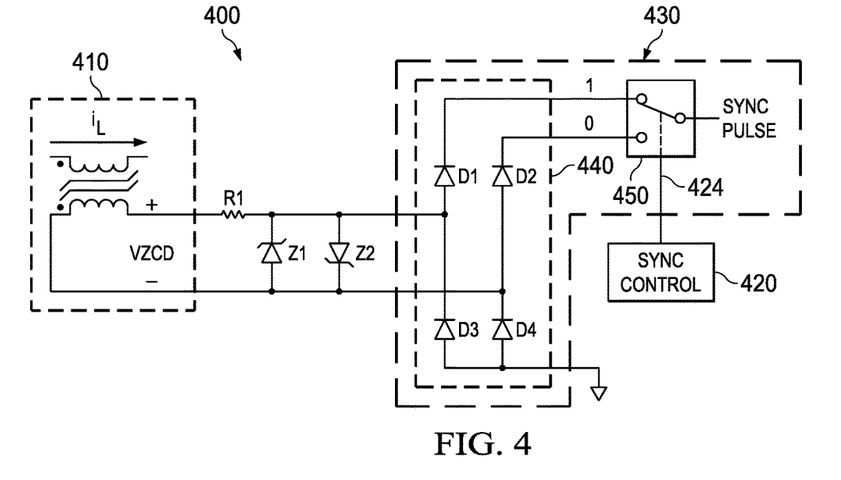
FIG. 4 illustrates an example of a zero current detection circuit.

FIG. 4 illustrates an example of a zero current detection circuit 400. A zero current detector (ZCD) circuit 410 can be implemented as a current sense transformer 414 to sense an inductor current $i_L$ of an inductor and generate a signal pulse VZCD indicating when an increasing cycle of the inductor current crosses a predetermined current value and when a decreasing cycle of the inductor current crosses the predetermined current value. The signal pulse VZCD is fed to series resistor R1 which feeds voltage clamping zener diodes Z1 and Z2 to control the magnitude of VZCD. A sync control 420 provides a control signal 424 specifying a mode of the circuit to selectively capture one of the signal pulses corresponding to the increasing or decreasing portion of the inductor current cycle.

A sync selector circuit 430 generates a sync pulse representing the signal pulse from the ZCD 410 that is selected in response to the control signal 424. The sync selector circuit 430 includes a rectifier circuit 440 to set the polarity of the sync pulse (e.g., to positive) notwithstanding the polarity of the signal pulse VZCD captured with respect to the increasing or decreasing portion of the inductor current cycle. For example, the rectifier circuit 440 includes diodes D1 through D4 to steer positive current pulses from the ZCD 410 regardless of the polarity of VZCD. The sync selector circuit 430 also includes a controllable switch device 450 to provide the sync pulse based on the control signal 424 and the first crossing of the inductor current with respect to the predetermined current value. For example, if the sync control 420 indicates a logic one value as the control signal 424, the switch device 450 can route positive going pulses from the ZCD 410 via D1 but is prevented from routing a subsequent pulse of opposite polarity. Likewise, if the sync control 420 indicates a logic zero value, the switch device 450 routes a positive pulse via D2 while rejecting subsequent pulses of opposite polarity.

Figure 5:
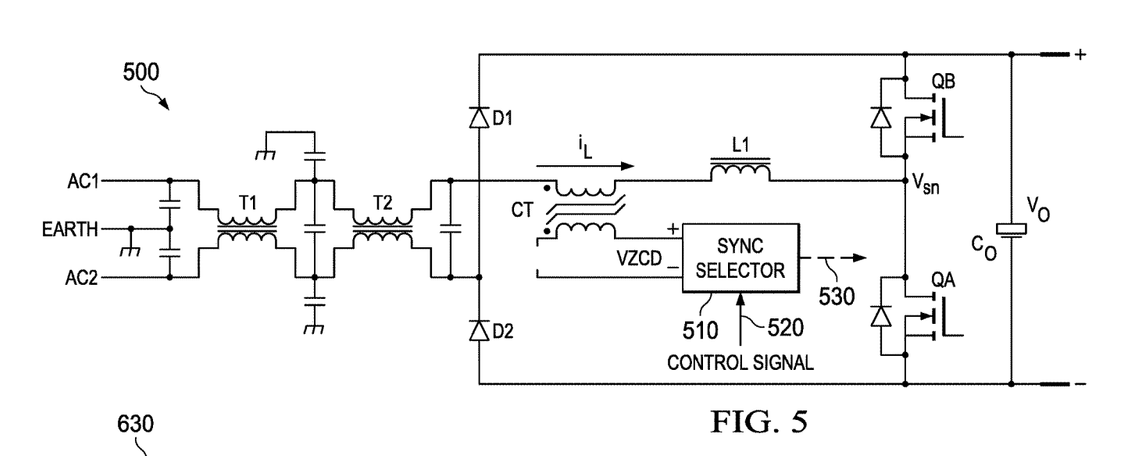
FIG. 5 illustrates an example power factor control circuit that utilizes a zero current detection circuit.

FIG. 5 illustrates an example power factor control circuit 500 that utilizes a zero current detection circuit. The circuit 500 is powered via an input AC waveform, shown as AC1 and AC2. The input waveform can be provided as an AC input voltage, such as a line-line or line-neutral voltage. The input waveform can be driven through noise reduction transformers T1 and T2. Output from T2 is provided to a zero current detection circuit where it is sensed via current transformer CT. The transformer CT includes a winding connected in series with inductor L1, which induces a corresponding sensing current in another winding thereof. Diodes D1 and D2 form a current rectification portion of a bridge circuit and the inductor L1 is driven via totem-pole switch devices QA and QB to supply power to output capacitor $C_O$. The zero current detection circuit also includes a sync selector 510 that employs a control signal 520 to generate a sync pulse 530 from the CT. For example, the control signal 520 can indicate which signal pulse to select for each cycle of the inductor current. The sync pulse is sent to a controller (not shown) to control operations and timing of QA and QB.

In this example, the control signal is generated via a polarity monitor, such as depicted in FIG. 2. The polarity monitor thus monitors the incoming AC1 and AC2 to generate the control signal (e.g., a 0 or 1) to indicate whether the AC input waveform is positive or negative during each half cycle thereof. The frequency of the input AC waveform typically is less (e.g., one or more orders of magnitude less) than the switching frequency of the switch devices QA and QB. Thus, numerous sync pulses are generated during each positive or negative portion of each half cycle of the input AC waveform. Further operations of the circuit 500 are described with respect to the signal and timing diagram of FIG. 6.

Figure 6:
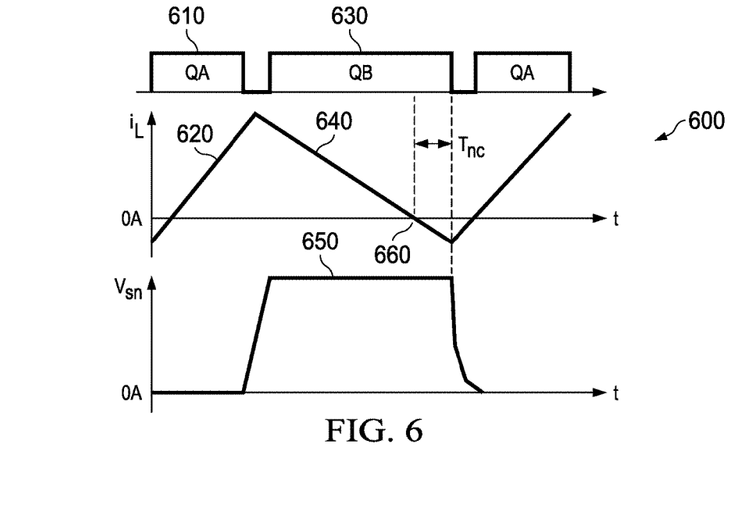
FIG. 6 illustrates an example signal diagram for the circuit depicted in FIG. 5.
Figure 7:
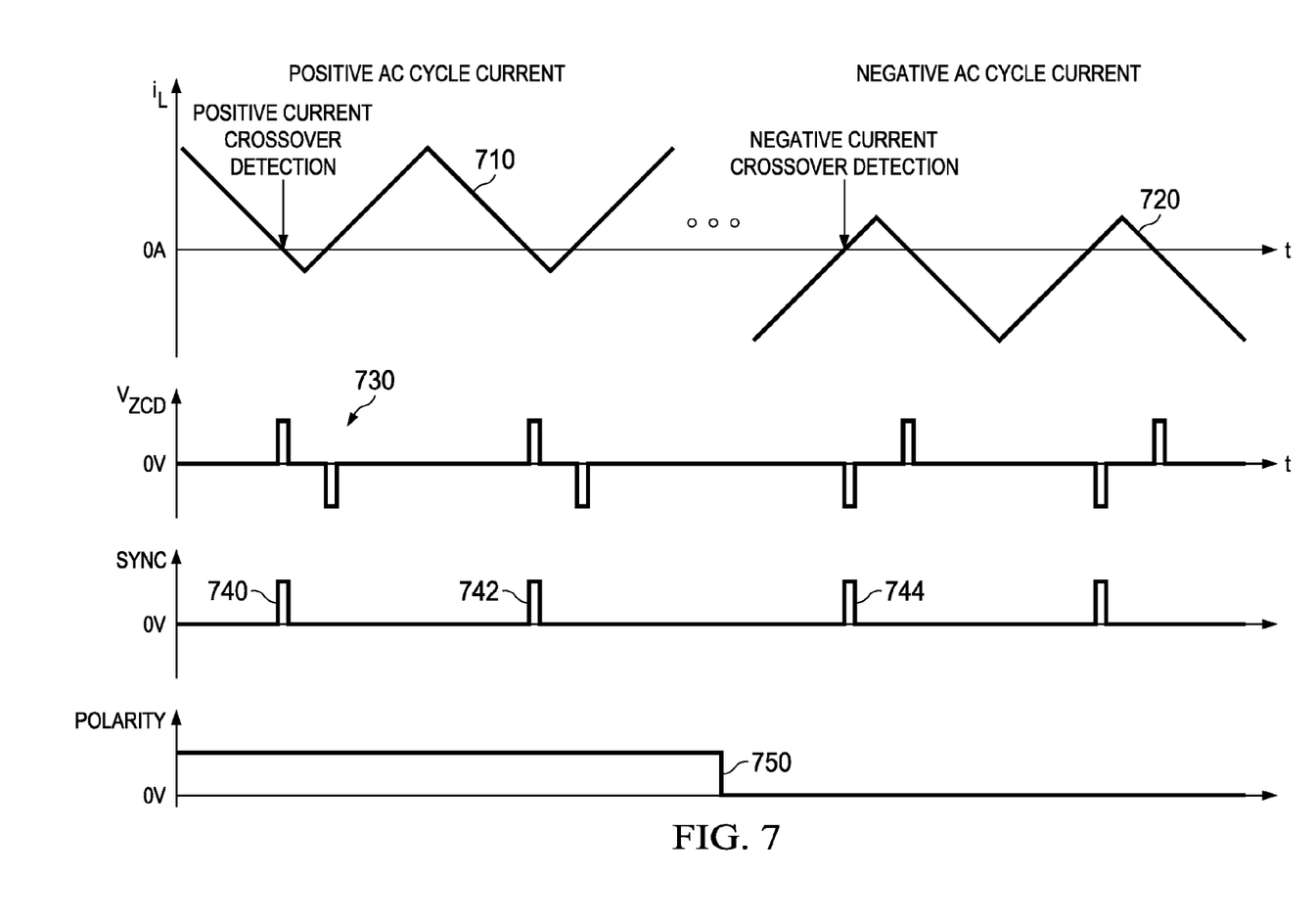
FIG. 7 illustrates an example signal and timing diagram for the circuit depicted in FIG. 5.

FIG. 6 illustrates an example signal diagram 600 for the circuit 500 depicted in FIG. 5. The signal diagram 600 represents operations when the AC input waveform is in its positive half cycle. Negative half AC cycles are shown in the example of FIG. 7. When the AC voltage is positive, the control signal 520 provided to the sync selector 510 would be set to a logic one value, indicating the AC input waveform is in the positive portion of the AC cycle. During this time, transistor QA is turned on via signal 610 which causes energy to be stored in L1, as shown at increasing inductor current $i_L$ in the inductor L1 having an increasing slope, demonstrated at 620. After QA is turned off via signal 610, QB is turned on via signal 630, which starts a discharge cycle for the common node, as shown. During this discharge cycle QB thus is activated to provide decreasing inductor current $i_L$ having a decreasing slope, demonstrated at slope 640. A common node voltage VSN, representing the junction of QA and QB rises and falls, at 650 based on the current flow through L1 in response to control of QA and AB.

It is desirable that the common node voltage VSN be at zero volts before reenergizing QA to provide zero volt switching operation of the converter. To implement the zero voltage aspect, transistor QB is turned on for an extended time period, shown as Tnc. The Tnc value is set to allow enough time to generate a negative current to discharge node VSN to zero during dead time (e.g., when both QA and QB are off). The sync pulse 530 is generated to trigger the beginning of period Tnc. As disclosed herein, the sync pulse 530 is generated when the inductor current 640 crosses a threshold at about zero current in this example, as shown at 660. When the control circuit receives the sync pulse 530, a timing circuit or control instructions can add a predetermined delay to the end of QB corresponding to the time Tnc which is used to generate a negative current to discharge VSN during dead time before initiating subsequent switching operations.

The predetermined time Tnc that is added to QB can be provided as a user-programmable value setting. For example, Tnc can be set to account for node capacitance, the load at Vo, the value of the inductor L1, the configuration of the QA and Oft as well as other parameters that which can affect the discharge rate of VSN. During the negative half cycle of the input AC voltage, QB acts as the charging switch device and QA acts as the discharging device. Other aspects of sync pulse generation and timing are shown with respect to FIG. 7.

FIG. 7 illustrates another example signal and timing diagram for the circuit 500 depicted in FIG. 5. In this example, the timing diagram shows the relationships between the inductor current $i_L$, VZCD, the sync signal and a polarity control signal (e.g., corresponding to control signal 220 in FIG. 2). At 710, inductor current $i_L$ is shown when the AC input voltage is during its positive cycle. At 720, the inductor current $i_L$ is shown when the AC input voltage is negative. The pulses output from the zero current detector (e.g., 110 or 410) is shown as VZCD at 730. The zero current detector generates a single pulse each time the waveforms 710 or 720 cross a current threshold (e.g., about zero amperes). The sync selector circuit (e.g., 150, 230, 330, 430, 510) and sync controls (e.g., 130, 210, 310, 420) disclosed herein can be configured to provide only one pulse for each cycle of the AC current, such as at the first zero crossing event of each cycle such as shown at 740, 742, and 744. The sync selector also provides a similar polarity signal pulse (e.g., positive) representative of the first pulse regardless of the polarity of VZCD at 730. The polarity control signal, which is utilized by the sync selector to select one of the signal pulses each cycle of inductor current, is shown at 750. In this example, the polarity control signal indicates which half of the AC cycle is driving the inductor L1.

Figure 8:
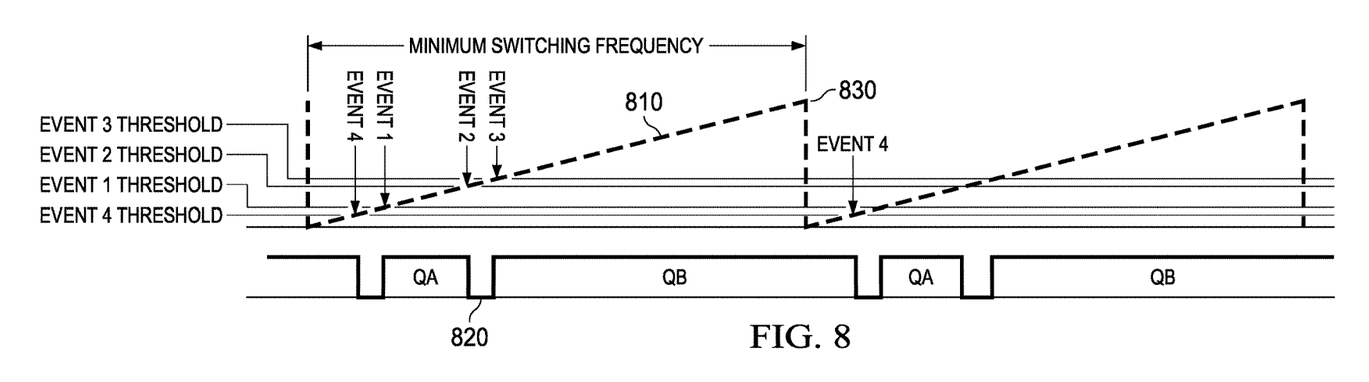
FIGS. 8 and 9 illustrate example timing waveforms for switch devices that are triggered from a zero current detection circuit.
Figure 9:
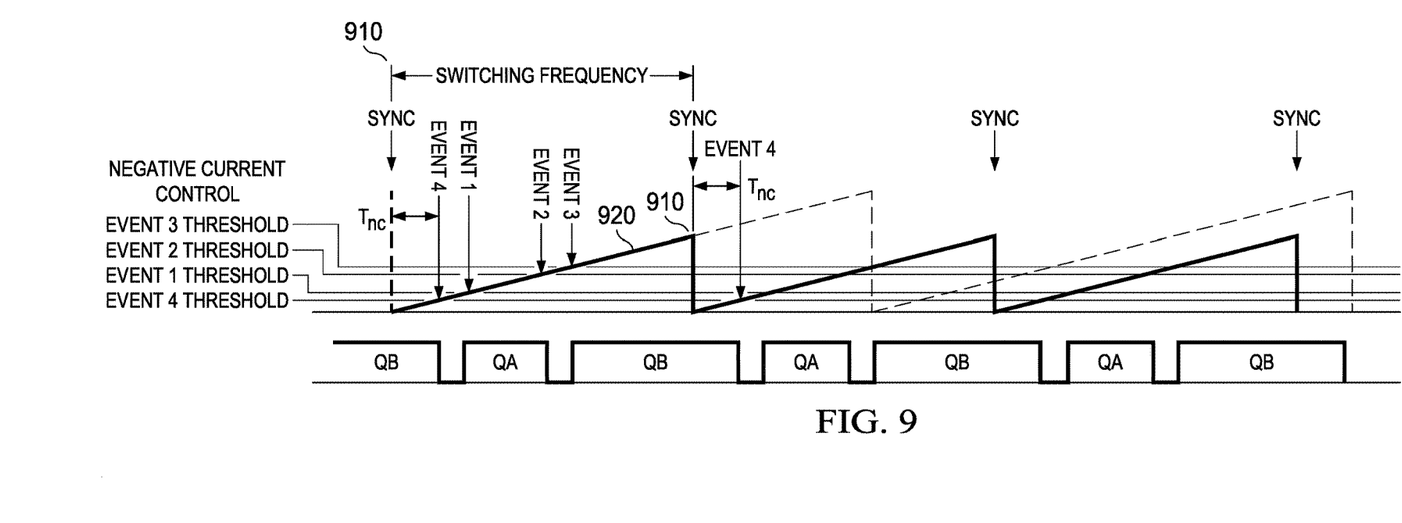

FIGS. 8 and 9 illustrate example timing waveforms for switch devices that are triggered from a zero current detection circuit (e.g., 100, 400, 500). The diagram of FIG. 8 represents converter operations at a minimum operating frequency. As load current increases, operating frequency decreases and, as load current decreases, operating frequency increases. A ramp waveform 810 represents the passage of increasing time which can be provided as a timer in a control circuit or via analog timing circuits. Events 1 through 4 are described which define the beginning and ending of the timing signals to control QA and QB. Event 1 represents the on-time of QA that begins current flow through the inductor resulting in storage of energy in the inductor. At a later time, event 2 marks the end of the on-time for QA. A fixed time period (e.g., delay) can be added at 820 where event 3 than begins the period of QB.

In this example, a maximum time period has elapsed before a sync pulse is received. The end of this maximum period is shown at 830. A predetermined time period (e.g., Tnc) is then added to the end of 830 to extend the on-time of QB to generate a negative current for the discharge of the common node VSN. Event 4 marks the end of this predetermined time period and the cycle then repeats. The ramp signal 810 is compared with Event 1 and 2 thresholds (e.g., counter values) and Events 3 and 4 to generate pulse width modulated (PWM) signals to drive QA and QB signal's rising and falling edge, as shown in FIG. 8. One threshold setting note is that Event 4's threshold is lower than Event 3. In this manner, QB is turned off in the next switching period to generate a constant negative current. When a sync pulse appears during a switching period, the signal resets the ramp signal 810 and starts a new ramping period. Therefore, the sync pulse controls the switching frequency in any value higher than the minimum switching frequency.

FIG. 9 illustrates converter timing diagram when sync pulses are received to trigger timing adjustments. In this example, the sync pulse results in increasing the switching frequency of the converter. In this example, a sync pulse is received at 910, which has the effect of resetting the ramp 920 before reaching the maximum time period demonstrated with respect to FIG. 8. When the sync pulse is received at 910, the predetermined time Tnc is added to extend the on-time period for Oft which enables the converter to generate a negative current for the common totem-pole node VSN discharge during dead time. The zero current detection circuit provides a robust hardware solution that generates a sync pulse to facilitate zero volt switch operations without requiring the control circuit to monitor current and compute new timing each inductor current based on such monitoring.

FIG. 10 illustrates an example multiphase circuit 1000 for a direct current (DC) to DC converter that employs ZVS and that utilizes a zero current detection circuit, as disclosed herein. In this example, N inductors are shown as L1 though LN, with N being a positive integer. Each inductor is driven from a respective totem-pole pair of switch devices. For example, Q1A and 01B drive L1, Q2A and Q2B drive L2, and QNB and QNA drive LN. Voltage V1 is lower than voltage V2. The converter can operate in buck and boost modes. In boost mode, V1 is used to generate V2. In buck mode, V2 is used to generate V1.

The zero current detection circuit includes a single current transformer CT1, which operates as a zero current detector to supply signal pulses to a sync selector 1010. As disclosed herein, the sync selector 1010 is controlled from control signal 1020. In contrast to the PFC converter receiving AC input waveform, such as described above, the control signal 1020 provided represents a user setting or controller-detected situation that defines whether the circuit 1000 is in buck or boost mode. This, in turn, controls which part of the totem-pole switch device pairs are active for storing energy in the inductor and which part of the switch devices are freewheeling to discharge the inductor. As disclosed herein, each the switches that are activated to discharge the inductor (e.g., freewheeling) are controlled to adjust their discharge times based on the sync pulses.

In this example, a control circuit (not shown) utilizes the sync pulse from the sync selector 1010 to control (e.g., extend) timing of at least two pairs of switch devices to provide an output voltage. One pair of switch devices (e.g., Q1A and Q1B in this example) control current through the inductor L1 as the master phase to drive the output voltage. One or more other pair of switch devices control current through another inductor, which can be considered a subordinate phase to the master phase, to drive the output voltage. Thus, after the master phase has been adjusted, the timing of each subordinate (e.g., slave) phase can be adjusted by the controller commensurate with the timing adjustment to the master phase based on the sync pulse. The sync pulse begins a delay period in the control circuit to increase the end of a discharge period of the inductor current in the master phase. The controller adjusts timing of the subordinate phase (or phases) based on timing adjustments to the master phase, thereby maintain appropriate synchronization among the phases cycle by cycle based on sync pulses generated for the master phase.

Figure 11:
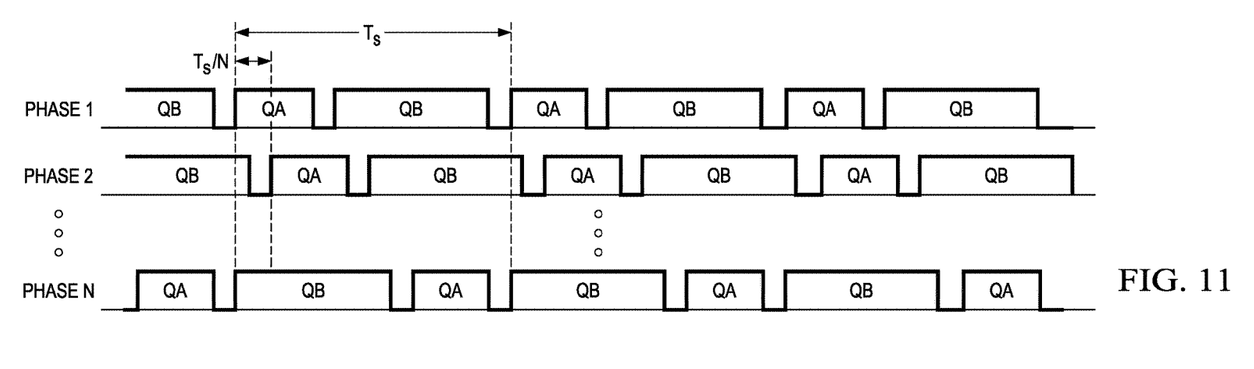
FIG. 11 illustrates an example timing diagram for the circuit depicted in FIG. 10.

An example of the timing relationships for the multiple phases is shown in FIG. 11, which illustrates an example timing diagram for the circuit 1000. It is noted that when a sync pulse is detected in the master phase, the switching frequency is adjusted for the master phase, and the same adjustments are propagated in each of the subordinate phases. In addition to the frequency adjustment, the subordinate phases are also offset in time from the master based on the additional time that was added to the end of the discharge cycle in response to the sync pulse. Thus, the hardware-based approach to generate sync pulse, as disclosed herein, can be applied to synchronize multiphase circuits, such as the circuit 1000. This is in contrast to existing solutions that use a digital signal processor (DSP) to sense load current and adjust the switching duty cycle and period of each phase cycle by cycle. For multiphase interleaved operations, such as the circuit 1000, a DSP may not have sufficient bandwidth for all its respective tasks while also maintaining that each the phases remain synchronized in a ZVS topology cycle by cycle. The hardware-based approach disclosed herein enables ZVS to be extended efficiently to multi-phase circuits.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit, comprising:
   a zero current detector (ZCD) circuit configured to sense an inductor current of an inductor and generate signal pulses indicating when an increasing cycle of the inductor current crosses a predetermined current value and when a decreasing cycle of the inductor current crosses the predetermined current value;
   a sync control configured to provide a control signal specifying one of the signal pulses corresponding to the increasing or decreasing cycle of the inductor current; and
   a sync selector circuit configured to generate a sync pulse representing the one of the signal pulses from the ZCD selected in response to the control signal, the sync pulse configured to trigger timing adjustment for a switch device.

2. The circuit of claim 1, wherein the ZCD circuit comprises a current sense transformer configured to generate the signal pulses from the inductor current.

3. The circuit of claim 2, wherein the current sense transformer comprises a ferrite bead that is configured to shape a width of the signal pulses based on a saturation parameter of the ferrite bead.

4. The circuit of claim 1, further comprising at least one zener diode at an output of the ZCD circuit to control a magnitude of the signal pulse.

5. The circuit of claim 1, wherein the sync selector circuit further comprising a rectifier circuit configured to control a polarity of the sync pulse with respect to the increasing or decreasing cycle of the inductor current.

6. The circuit of claim 5, wherein the sync selector circuit further comprises a controllable switch device configured to provide the sync pulse as one of the signal pulses selected during a given cycle of the inductor current with respect to the predetermined current value based on the control signal.

7. The circuit of claim 1, further comprising a control circuit configured to control timing of at least one pair of switch devices, the control circuit configured to adjust the on-time of one of the pair of switch devices based on the sync pulse to discharge the inductor current.

8. The circuit of claim 7, wherein the control circuit is configured to operate the sync control to generate the control signal based on a buck or boost setting for a converter circuit that includes the at least one pair of switch devices.

9. The circuit of claim 7, wherein the sync control comprising a polarity monitor circuit configured to monitor an input alternating current (AC) waveform that drives the inductor, the polarity monitor circuit configured to generate the control signal indicating a positive or negative portion for each cycle of the input AC waveform.

10. The circuit of claim 7, wherein the control circuit configured to utilize the sync pulse to control the switch devices in a power converter configured as at least one of a power factor correction circuit, a boost mode DC/DC converter circuit, and a buck mode DC/DC converter.

11. A circuit, comprising:
    a zero current detection circuit configured to sense an inductor current of an inductor and generate a sync pulse indicating when a discharge cycle of the inductor current crosses a predetermined current value; and
    a control circuit configured to utilize the sync pulse to control timing of at least one pair of switch devices, the sync pulse configured to begin a delay period in the control circuit to increase an end portion of a discharge period of the inductor current for one of the pair of switch devices.

12. The circuit of claim 11, the zero current detection circuit further comprising:
    a zero current detector (ZCD) circuit configured to sense the inductor current of the inductor and generate signal pulses indicating when an increasing cycle of the inductor current crosses the predetermined current value and when a decreasing cycle of the inductor current crosses the predetermined current value;
    a sync control configured to provide a control signal specifying one of the signal pulses corresponding to the increasing or decreasing cycle of the inductor current; and
    a sync selector circuit configured to generate the sync pulse representing one of the signal pulse from the ZCD that is selected in response to the control signal, the sync pulse configured to trigger timing adjustment for at least one pair of the switch devices.

13. The circuit of claim 12, wherein the ZCD circuit comprises a current sense transformer configured to generate the signal pulse from the sensed inductor current.

14. The circuit of claim 12, further comprising at least one zener diode at an output of the ZCD circuit to control a magnitude of the signal pulse.

15. The circuit of claim 12, wherein the sync selector circuit further comprising a rectifier circuit configured to control a polarity of the sync pulse with respect to the increasing or decreasing cycle of the inductor current.

16. The circuit of claim 15, wherein the sync selector circuit further comprises a controllable switch device configured to provide the sync pulse as one of the signal pulses selected during a given cycle of the inductor current with respect to the predetermined current value based on the control signal.

17. The circuit of claim 12, wherein the control circuit is configured to operate as the sync control to generate the control signal based on a buck or boost setting for a converter circuit that includes the at least one pair of switch devices.

18. The circuit of claim 11, wherein the control circuit is configured to utilize the sync pulse to control the switch devices in a power converter configured as at least one of a power factor correction circuit, a boost mode DC/DC converter circuit, and a buck mode DC/DC converter.

* * * * *